C. R. RAGSDALE.
TIRE SHIELD.
APPLICATION FILED AUG. 16, 1910. RENEWED MAR. 14, 1912.
1,039,671.
Patented Sept. 24, 1912.
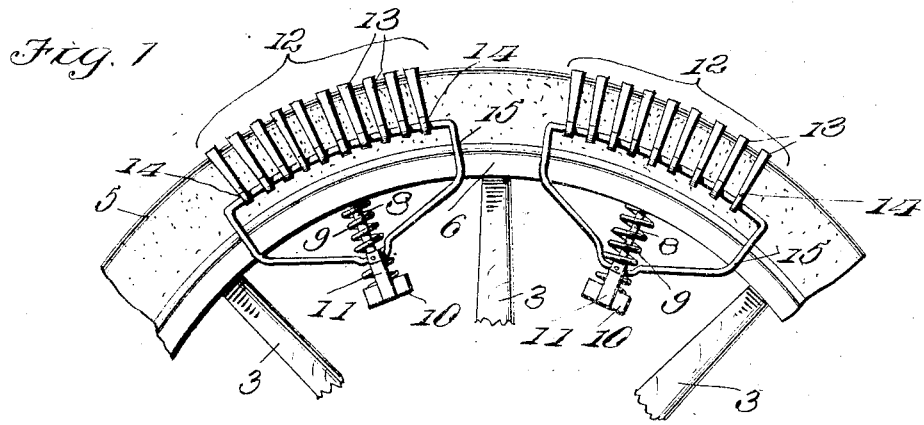
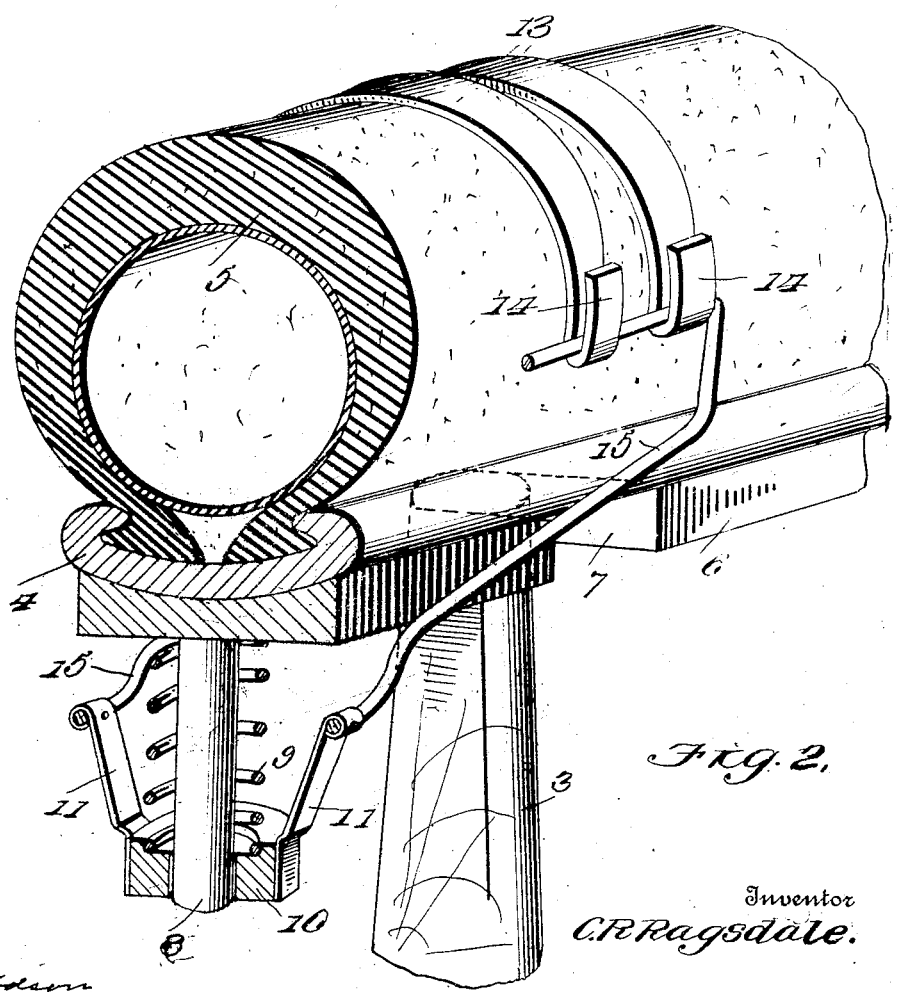

UNITED STATES PATENT OFFICE.

CHARLES R. RAGSDALE, OF ST. LOUIS, MISSOURI, ASSIGNOR, BY DIRECT AND MESNE ASSIGNMENTS, OF THREE-FOURTHS TO GERTRUDE CREWDSON RAGSDALE AND ONE-EIGHTH TO IDELLA M. RAGSDALE, OF ST. LOUIS, MISSOURI, AND ONE-EIGHTH TO D. I. SMITH, OF PADUCAH, KENTUCKY.

TIRE-SHIELD.

1,039,671.  Specification of Letters Patent.  Patented Sept. 24, 1912.

Application filed August 16, 1910, Serial No. 577,403. Renewed March 14, 1912. Serial No. 683,705.

*To all whom it may concern:*

Be it known that I, CHARLES R. RAGSDALE, a citizen of the United States, residing at St. Louis and State of Missouri, have invented certain new and useful Improvements in Tire-Shields, of which the following is a specification.

My invention relates to devices for protecting pneumatic tires and particularly to that class of tire protectors in which a plurality of metal shields are supported upon the tread surface of the pneumatic tire, said shields being held in place so as to conform to the deflection of the tire and so as to fit the tire snugly and firmly and yet be readily detachable.

The primary object of my invention is to provide an improved tire shield of this character having a very simple and effective form in which the shields or protecting sections are elastically held to the face of the pneumatic tire by devices mounted within the felly of the wheel, these devices being resilient so as to take up any lost motion, and so as to hold the shields securely in place but permit them to yield to any deflection of the tire.

A further object is to provide a tire protector composed of a plurality of sections, each section in turn having a plurality of relatively small shields, each of these shields being independently yieldable and at the same time affording a thorough protection against puncture.

A still further object is to provide a construction of the character described in which the small independent shields are capable of being readily attached to and detached from the supporting means so as to permit shields of a certain form to be substituted for the ordinary shields in wet and slippery weather so as to give the wheel a grip upon the road which it otherwise would not have.

My invention is shown in the accompanying drawings wherein:

Figure 1 is a fragmentary elevation of a portion of a vehicle wheel showing my improved tire protector applied thereto. Fig. 2 is a perspective view of a portion of a vehicle wheel partly in section, the tire protecting devices being also partly shown in section.

Referring to these figures, 2 designates a vehicle wheel of any suitable construction having the spokes 3 and the usual rim or felly 4 upon which is mounted the pneumatic tire 5, this tire being of any suitable or desired character.

Preferably my improved shields are held in place by means of a ring or annular member 6 which is intended to fit within the felly 4, and to that end is formed with transversely extending slots 7 which extend inward from one edge of the ring plate 6 to a point slightly beyond the median line of the ring. These slots 7 are for the purpose of permitting the ring 6 to be slipped into alinement with the felly and past the outer ends of the spokes 3. The ring plate 6 is provided with a plurality of inwardly extending posts 8, these posts being disposed midway between the slots 7 and in a median plane. The posts it will be seen extend inward between each two spokes. These posts are similar to stud bolts and are rigidly attached to the ring 6.

Surrounding each post is a coil spring 9 which bears against a shiftable sleeve 10 which is provided with oppositely disposed arms 11 extending toward the ring plate and slightly outward. It will be seen that the ring plate may be easily slipped inside the felly of a wheel or removed therefrom without difficulty, and that by reason of its engagement with the spokes there is no creeping movement of the rim. It is held from any lateral movement by the devices which hold the shield in place upon the pneumatic tire.

The tire protector proper consists of a plurality of shield sections 12, each section being composed of a plurality of shields 13 having the form of an elongated ellipse and curved to conform to the tread of the tire, the lateral extremities of each shield being bent over upon the main body of the shield to form the outwardly and upwardly turned hooks 14. These hooks are relatively deep or long for a purpose to be hereafter described. I have shown each section of my tire protector as being formed with six of these shields but of course I do not wish to be limited to this number.

For the purpose of holding the shields of each section in place upon the pneumatic tire, I provide for each section the oppositely disposed rigid loops 15, these loops having a substantially triangular form and being made of metal. The loops are not designed to bend or give in any way and are made of such cross sectional area as to have a proper degree of rigidity. The apex of the triangle extends downward and is engaged rigidly with the adjacent arm 11 on the sleeve 10, while the base of the triangle is engaged by the adjacent hooks 14 of the shields 12. There are as many of these tire sections as may be desired. All of them are drawn into yielding engagement with the face of the tire by means of the spring 9. The hooks 14 are formed relatively long so as to permit one of said plates or shields 13 to yield without affecting the other shields of the same section. It will be seen that these relatively long hooks 14 permit an inward and outward movement of the shields 13 independent of each other. It will also be seen that it is a very easy matter to attach or detach the several sections upon the wheel, it being only necessary to compress the spring 9 and engage the loops with the hooks of the shields. Upon a release of the spring 9 the spring will cause the loops 15 to be drawn taut, thus holding the shields firmly in place. It will also be plain that any one of the shields 13 may be removed in case of wear and another one substituted, and that hence the protector as a whole may be kept in thorough repair, and that a damage of one of the shields will not cause the entire protector to be thrown away or necessitate the entire protector being carried to a repair shop. Furthermore, this peculiar construction permits shields having different faces to be attached to the loops 15 to suit varying requirements. Thus it is possible to remove several of the shields of each section and substitute therefor a shield having a greater thickness or depth than the shield which is removed, this thicker shield acting as a tooth and engaging the roadway so as to give a firm traction upon the road.

While I have illustrated the posts 8 as being applied to an interior ring 6, I of course do not wish to be limited thereto as it would be entirely possible to put the posts 8 upon the inside of the felly so that the posts 8 should be a permanent part of the wheel. The construction illustrated, however, permits my devices to be applied to a wheel not equipped with the inwardly extending posts and permits the device as a whole to be easily removed when conditions permit the wheel to be run without an armor.

What I claim is:

1. A tire protector comprising a plurality of protector sections, each composed of a plurality of relatively small shields adapted to cover and protect the tread of a pneumatic tire, a plurality of independent springs mounted inside the felly of the wheel, pairs of oppositely disposed rigid loops, a pair for each section of the protector, said loops being engaged with the opposite ends of the shields of the section and with said springs.

2. A tire protector comprising a plurality of protector sections, each section being composed of a plurality of laterally curved shields, the extremities of the shields being formed with hooks, a plurality of inwardly extending posts mounted inside the felly of the wheel, a spring surrounding each of said posts, a sleeve slidable on the post and urged inward by the spring, said sleeve being formed with oppositely disposed arms, and rigid triangular loops disposed on either side of the wheel, said loops being engaged with the arms on the sleeves and with the shields of each section of the protector.

3. The combination with a wheel having a plurality of inwardly extending posts, springs surrounding the posts and sleeves slidably mounted on the posts and having oppositely disposed arms extending toward the tire of the wheel, of oppositely disposed triangular rigid loops, the apices of the loops being engaged with the arms on the sleeves, and a plurality of shields, each laterally curved to conform to the curvature of the pneumatic tire, each shield being independent of the adjacent shields and being formed with outwardly extending hooks adapted to engage over the said rigid loops.

4. A tire protector comprising a plurality of independent protector sections, each composed of a plurality of parallel laterally curved relatively small arcuate shields extending transversely, said shields being independent of each other, and independent means for each protector section for resiliently drawing the shields of said section radially toward the hub of the wheel and into engagement with the tread surface of the tire, said means permitting the independent movement of each of said shields and permitting the shields to be detached from engagement therewith.

In testimony whereof I affix my signature in presence of two witnesses.

CHARLES R. RAGSDALE. [L. S.]

Witnesses:
PHILIP CRISTAL,
JOHN M. WOODMAN.